May 9, 1950 W. H. BACH 2,506,764
VIEW FINDER FOR CAMERAS
Filed Nov. 23, 1945
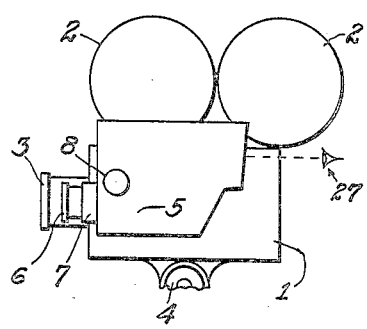
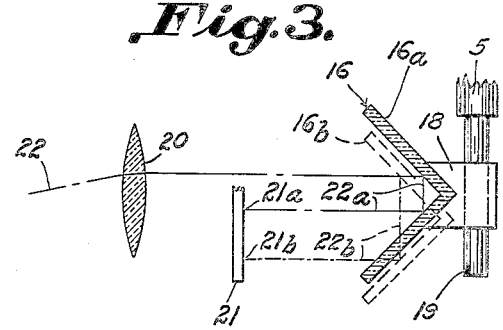
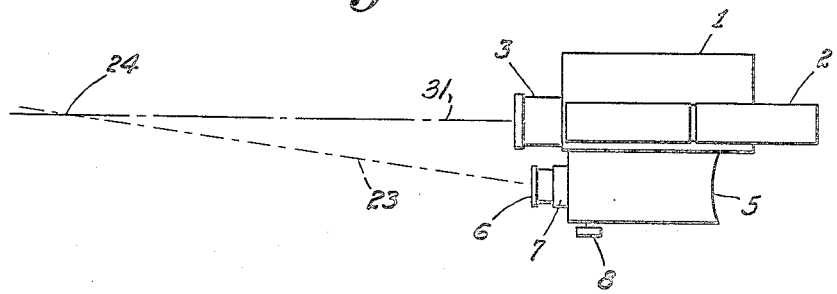
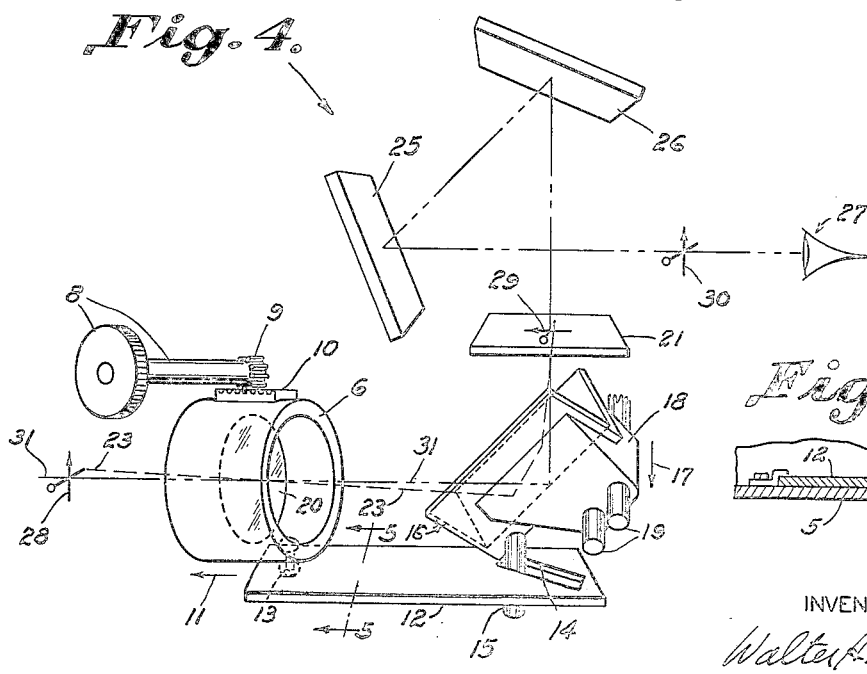
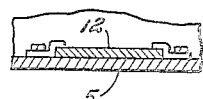
INVENTOR
Walter H. Bach
BY Robt. D. Pearson
ATTORNEY Patented May 9, 1950

2,506,764

UNITED STATES PATENT OFFICE 2,506,764

VIEW FINDER FOR CAMERAS

Walter H. Bach, Hollywood, Calif.

Application November 23, 1945, Serial No. 630,211

3 Claims. (Cl. 88—1.5)

This invention relates to view finding instruments for cameras and the like, more particularly to that class employed for motion picture and television cameras.

Because of the uses to which motion picture and television cameras are put, these view finder instruments are subject to much necessary abuse and also to some accidental shock, resulting in injury to the view finder mounting means and destroying the accuracy of the view finder calibrations and adjustments with relation to the camera lens and picture taking aperture.

An object of my invention is to eliminate the fragile mounting means between the view finder and the camera, often required to have delicate adjusting means of light weight construction to permit the view finder body to move with relation to the camera body for correcting view finder parallax in the well known manner.

My invention provides a shockproof, rugged and reliable view finder built as an integral part of the camera body if desired, and showing a view finder image which is upright and correct right to left, visible to both eyes of the camera operator throughout a wide viewing angle. The delineation of the field or frame in the view finder is substantially identical to the delineation of the frame of picture being photographed on the motion picture film at the camera aperture, or being televisioned by the television camera, when the camera lens and finder lens are both focused on the same object.

The means whereby this is accomplished by the invention will be better understood from a consideration of the following detailed description, of a preferred embodiment thereof, reference for this purpose being had to the accompanying drawing, in which:

Fig. 1 is a side elevation of a camera showing the device of the present invention applied thereto.

Fig. 2 is a top plan view illustrating the application of the invention, looking down on the camera shown in Fig. 1.

Fig. 3 is a diagram showng a portion of the optical system of a view finder in accordance with my invention, and illustrating the method of shifting the view finder image for parallax compensation.

Fig. 4 is a diagrammatic perspective view showing the optical system mechanism of a view finder in accordance with my invention.

Fig. 5 is a fragmental cross-sectional detail taken on line 5—5 of Fig. 4.

Although I have shown and will describe the invention as applied to a particular type of camera, it will be understood that the utility of the device is not restricted to this one form of camera, and that it may be considered as applicable to cameras in general.

The particular motion picture camera illustrated in the drawings shows a camera body 1 having film chambers 2 and a picture taking lens 3, adjustably mounted on a tripod head or camera mount 4 of known form. Incorporated as an integral part of the camera body 1 is the view finder body 5 which forms a guide for a view finder lens tube 6 slidably mounted for focusing inside tube 7 which is part of the view finder body 5.

The view finder lens 20 is focused by knob and shaft 8 and pinion 9 engaging the rack 10 mounted on lens tube 6. Slide 12 is slidably mounted in a guiding channel (shown in Fig. 5) which causes the slide 12 to move in a path parallel to the direction of view finder lens 20 movement. When the lens tube 6 is moved forward in the direction of arrow 11, cam slide plate guide 12 which is attached to lens tube 6 by suitable means 13 also moves forward. The cam slot 14 engaged by cam follower rod 15 and roof mirror 16 causes roof mirror 16 to move at right angles (arrow 17) to lens tube 6 and slide 12 movement (arrow 11).

The roof mirror 16 consists of two front surface mirrors separated by an angle of exactly ninety degrees, in cradle 18 which is slidably mounted on rods 19 to travel horizontally at a ninety degree angle to the paraxial ray 31 of the lens 20, and the direction of travel of the view finder lens 20 mounted in lens tube 6 and view finder tube 7.

The lens 20 in its focusing mount 6 forms an image 29 which is reflected by roof mirror 16 onto a ground glass viewing screen 21. Because of the double reflection by roof mirror 16, of the light rays which form image 29, as shown by ray 23 traced through the optical system, the image 29 which ordinarily would be reversed right to left on the ground glass viewing screen 21 is corrected so that it appears in the same position right to left as the original object 28. When this corrected right to left image 29 formed on the ground glass 21 is viewed at 27 by means of two front surface mirrors 25 and 26, the image 30 appears upright and correct right to left.

As indicated in Fig. 3 the rods 19 are mounted on the view finder body 5. When the roof mirror 16 is moved from position 16a to position 16b (indicated by broken lines) the image 29 formed by lens 20 on the ground glass viewing screen 21 will move from position 21a to 21b as indicated by tracing one ray 22 through the optical system where it takes the path 22a when the roof mirror 16 is in position 16a and where ray 22 takes the path 22b when the roof mirror 16 is in position 16b.

The image 29 formed on ground glass viewing screen 21 after reflection from roof mirror 16 will move exactly twice the distance which roof mirror 16 is moved and in the same direction without change of focus. By a suitable choice of angle for cam slot 14, determined by the distance between camera lens 3 and view finder lens 6 for any given set of view finder optics, it is possible to cause image 29 on the ground glass viewing screen 21 to move to one side, bringing into view on the ground glass frame the exact picture which is being photographically impressed on the film by the camera lens 3, thus correcting for parallax existing between the camera line of sight 32 and the view finder line of sight 23 when both are focused at a point 24 in front of the camera.

In this manner parallax correction is accomplished with the finder body 5 being preferably a solid portion of the camera body 1 and therefore not subject to misalinement, and with all portions of the optical system of the view finder solidly held in place and protected from injury in an enclosed casing.

From the foregoing description it is believed that the operation of the device will be apparent. Many variations of the view finder optical system are possible. Also everything accomplished with the front surface mirrors can also be done with prisms, as is well known.

Having described only a typically preferred form of my invention, I do not wish to limit myself to the specific details set forth, but wish to reserve to myself any changes or variations that may appear to those skilled in the art and which fall within the scope of the following claims.

I claim:

1. The combination, with a camera body having a focusing photographic lens; of a view finder unit supported in fixed relation to said camera body, a focusing finder lens barrel surrounded by said view finder unit having a view finding objective supported therein, a plate connected with the view finding objective and extending therebehind, said plate having through it a cam slot, a cradle consisting of a block having an angular recess in its upper side said cradle being mounted for linear movement transverse to the optical axis of said finding objective, a cam follower projecting downwardly from said cradle through said slot, two flat plate mirrors supported by said cradle and nested within the recess thereof so as to dispose their reflecting surfaces at an angle of ninety degrees in relation to each other and intersecting on a line angularly disposed to the optical axis of said finding objective and to said linear movement, said mirrors being thus positioned to direct an image to a viewing screen which is fixed in position, a guide whereon said slotted plate is slidably mounted and manually operable means including a rack, a spaced reducing pinion to adjust said barrel and slide together with said mirrors, and viewing mirrors mounted upon the camera to cooperate with said mirrors which are supported by said cradle.

2. In combination with a camera body having a focusing photographic lens; a view finder unit supported in fixed relation to said camera body; a focusing finder lens in said unit supported in a movable lens barrel; image erecting means comprising a pair of mirrors intersecting along a ridge and at an angle of ninety degrees to each other, said ridge being disposed at an angle to a plane common to the axes of said photographic lens and said finder objective; a fixed screen positioned outside of said common plane and adapted to receive an image formed by said view finder lens and reflected by said image erecting means; and connecting means comprising a slotted plate and a pin extending through the slot thereof connected between said finder lens barrel and said image erecting means, said connecting means being adapted to move said mirrors as a unit in linear movement in said plane and transverse to said finder lens axis in such manner and direction that the delineation of the field of frame in the view finder is identical to the delineation of the frame of picture being photographed on film in said camera when the camera photographic lens and the view finding objective are focused on the same point in front of said camera.

3. In a camera of the type having a primary objective lens and an adjacent finding objective lens positioned and adapted to form a duplicate image of that of said primary objective lens, parallax correcting means comprising: a roof reflector having angularly disposed surfaces positioned to intersect the optical axis of said finding lens, said surfaces intersecting each other in a ridge and said ridge being disposed at an angle to said finding lens axis whereby to deflect the same in an emergent branch out of a plane common to the axes of said objective lenses; a screen positioned in said emergent branch adapted to receive an image focused by said finding lens; supporting means for said reflector including a carriage adapted for motion in said common plane and transverse to said finding lens axis; means to move said finding lens objective axially to focus said image on said screen; and interconnecting means comprising a member having a slot angularly disposed to said finding objective axis and a pin slidably positioned in said slot, said interconnecting means being connected between said focusing means and said carriage whereby to move the latter and said reflector in said transverse movement and in accordance with focusing movement of said lens.

WALTER H. BACH.

REFERENCES CITED

The following references are of record in the file of this patent:

UNITED STATES PATENTS

| Number | Name | Date |
| --- | --- | --- |
| 1,998,568 | Barenyi | Apr. 23, 1935 |
| 2,219,314 | Hoch | Oct. 29, 1940 |
| 2,336,330 | Wittel | Dec. 7, 1943 |
| 2,355,136 | Bedford | Aug. 8, 1944 |
| 2,423,967 | Dalotel | July 15, 1947 |

FOREIGN PATENTS

| Number | Country | Date |
| --- | --- | --- |
| 11,640 | Great Britain | of 1896 |
| 407,552 | Great Britain | Mar. 22, 1934 |
| 548,569 | France | Oct. 25, 1922 |
| 678,148 | France | Dec. 23, 1929 |